United States Patent Office 2,708,631
Patented May 17, 1955

2,708,631

LECITHIN COMPOSITION AND METHOD OF PRODUCING THE SAME

Elias R. Neiman, Chicago, Ill., assignor to Sadie Neiman

No Drawing. Application October 21, 1952, Serial No. 316,073

2 Claims. (Cl. 99—15)

This invention relates to a composition or product including lecithin, and to the method of compounding or producing the same. It has for one object to provide a method of producing a stabilized lecithin product or composition for use generally in edible products where the presence of lecithin is desirable. Although the invention is not limited to any particular use of the product, it has important advantages in bakery goods and in ice cream.

Another object is to produce a dry, granular or powdered material including lecithin in such form that the material does not compact or become clumped and may be readily poured or discharged or removed from a container at the time of use. It has been recognized generally that lecithin is difficult to mix with other products, particularly in the mixing of ingredients for bakery goods, because of its physical properties it tends to clump and mass together to make adequate mixing practically impossible.

Lecithin however has important and valuable qualities when used in food products and particularly when used in bakery products. It tends, among other advantages, to produce a product of increased richness with greater rise, increased volume, reduced weight and improved color. Lecithin in bakery goods also tends to produce a tender crust on bread. It acts as a mould inhibitor and increases the flavor and improves the taste of such products.

Many of the advantages of lecithin as used in food products are known and recognized and attempts have been made in the past to provide a lecithin product of composition of such nature as to be stored readily and to mix readily with the other ingredients of bakery products. It has been proposed to mix lecithin with salt and with certain sugars. The mixing of lecithin with sugars produces a sticky product which requires complicated heat treatment and re-grinding. The mixing of lecithin with salt produces a product which can be used only sparingly as a vehicle or carrier of lecithin in bakery goods because for reasons of taste and flavor only a limited quantity of salt can be used in any edible bakery product.

Experience with a salt lecithin composition indicates that the maximum lecithin which can be combined or associated with salt is of the order of one part lecithin to twenty-five parts salt. Since only one pound of salt can be used to approximately one hundred fifty pounds of bread dough, it is obvious that the lecithin which can be introduced by means of a salt composition must be held to such small relative quantities that its effectiveness in the bakery product is reduced almost to nothing.

It is an important object of this invention to produce a lecithin product or composition in which all of the ingredients other than the lecithin are materials which are commonly used in baking and are advantageous of themselves in bakery goods.

It is an object therefore of the invention to use such materials to mix with the lecithin and to produce as a result of that mixture a satisfactory product by means of which substantial quantities of lecithin may be added to the mix for bakery goods at the time of their preparation. Because the other ingredients of the composition are normally used in bakery goods and are suitable and even necessary in bakery goods, they may be used in sufficient quantities to carry into the bakery goods sufficient quantities of lecithin without in any way detracting from the flavor, taste and attractiveness of the bakery goods so treated.

The product of the present invention is a finely divided, granular or powdered material which keeps without clumping or hardening for long periods and which can be readily and uniformly mixed with water or flour in any baking process. The ingredients, other than lecithin, which form a part of the product are water soluble and hence themselves mix readily with water in the preparation of materials for baking.

In carrying out the method and making the product of the present invention, lecithin is mixed with anhydrous dextrose and, preferably, a small quantity of vanillin is added.

The anhydrous dextrose takes up a substantial proportion, up to twenty percent, of lecithin by weight. Anhydrous dextrose is generally found in crystalline or granular form, and these crystals have and contain cavities of substantial volume. They are thus readily able to absorb or to take up lecithin. After the mixing, the product, as stated, may contain approximately 20% by weight of lecithin. Hence the addition of the product to bakery goods will carry into the goods a substantial quantity of lecithin and this is particularly true because the dextrose is commonly used in baking and does not produce the unpleasant or unsatisfactory tastes which are inevitably produced with excesses of salt or other products with which in the past lecithin has been combined. The dextrose is a recognized sweetening ingredient for bakery goods; it is also used extensively in the manufacture of ice cream. Therefore, it may be used in substantial quantities and when so used because of the high proportion of lecithin in the dextrose-lecithin composition, substantial quantities of lecithin are carried into the mixture and are present during baking. The lecithin is thus available in the bakery materials in substantial quantities for inter-mixture with the dry flour or other food ingredients and is present thus in properly inter-mixed form. The dextrose is water soluble and since each particle of dextrose carries a quantity of lecithin, the lecithin is widely and evenly distributed.

When liquid is added, the dextrose is dissolved and the lecithin enters the mix satisfactorily. The lecithin will combine properly with the dextrose and the composition will combine and mix properly with the flour and other ingredients, without the addition of any other product or material. No added ingredient is required to cause satisfactory association of dextrose and lecithin to produce a dry granular or powdered and easily stored and used product. If desired, flavoring material may be added. This will of course be a flavoring which is satisfactory in the bakery product for which the material of this invention is intended. Vanillin is a synthetic vanilla flavoring and is among those which may be used. Other flavoring material or synthetic flavoring material may be used and the invention is not limited to the use of any flavoring nor is it limited to the use of vanillin when a flavoring is to be used.

The preferred method of mixing the ingredients to form the product of this invention includes the following steps:

(1) Anhydrous dextrose is poured into a mixing machine. This machine may be of any type but it comprises means for mixing and stirring ingredients within the machine. No temperature control is necessary and the machine may be open to the air. It is merely a mixing and stirring device. It may be covered, if desired.

After the dextrose is present in the machine, the next step is taken.

(2) Lecithin is slowly poured over the revolving anhydrous dextrose as the stirring and mixing action continues. Lecithin as normally available is a semi-liquid, thick material which pours but does not flow freely. As the lecithin is poured into and mixed with the anhydrous dextrose, during the continuing action of the mixing machine, the dextrose crystals or granules become bright yellow, and a dry, free-flowing product is produced. The lecithin mixes immediately with the dextrose and there is no sticky or gummy product when the dextrose and lecithin are mixed in the proper proportion. The lecithin immediately loses its thick condition and appears to be absorbed at once into the dextrose particles and the total mixture is dry, granular, and free-flowing. It does not pass through any intermediate stage in which there is any thick liquid, semi-liquid, or gummy consistency. Preferably the proportion is of the order of two hundred pounds of anhydrous dextrose to which is added thirty-five or forty pounds of lecithin. A lesser proportion of lecithin may be used, and will be used if desired. The proportion indicated is generally satisfactory and since as a rule it will be desirable to make a mixture in which lecithin is present in the highest proportion suitable for the formation of a satisfactory product, the proportions indicated will ordinarily be followed.

(3) To the mixture which thus comprises between 235 and 240 pounds, about two ounces of vanillin may be added after the mixture of the dextrose and lecithin has been completed. This quantity of vanillin will give some preservative effect and will add flavor and aroma to the mixture and thus will remain in the mixture. If desired, obviously, the flavoring material may be omitted.

In carrying out the method above described experience has shown that the lecithin is absorbed by or taken up by the anhydrous dextrose so completely and so rapidly that all tendency to form a sticky or greasy mass is eliminated and the product forms a powder so rapidly when the ingredients are mixed within the proportions indicated above that none of the product and none of its ingredients adhers to the mixing machine. When the mixing is completed, the product is poured from the machine and nothing remains within the machine. Thus, by the method of this invention, a satisfactory dry, granular, crystalline or powdered mixture is formed in a direct, simple mixing operation without the necessity of special heat or pressure conditions and by the use of the simplest mixing machinery. By this process the lecithin, which is ordinarily, as available in commerce, a sticky, gummy material, impossible to mix directly with flours or doughs, is combined into dry form with ingredients which are normally desirable in bakery goods, and in this form it can be very readily and uniformly mixed. There is no necessity of any after treatment of the mixture of dextrose and lecithin. In the past, in the case of ordinary sugar, either beet, cane or corn sugar, when such sugars are mixed with lecithin a sticky mass has been produced which required first to be dried out by heat and thereafter to be ground, and even this has produced an unsatisfactory product. By the use of anhydrous dextrose as a vehicle for the lecithin all of such steps and treatments are avoided and a satisfactory direct mixing in a single step produces a satisfactory, uniform, dry, free-flowing, granular or powdered material containing a high proportion of lecithin.

This product, which is easy to use, gives to the bakery goods produced with it, all the healthy benefits of lecithin, including substantial quantities of amino acids and proteins, and this is accomplished by the use of dextrose which in and of itself is a desirable ingredient in bakery goods. The invention is not limited to the combination of the lecithin with anhydrous dextrose. Other products which are beneficial to bakery goods or which may even be inherent when used in bakery goods can be combined with lecithin. It is sufficient if these products are non-harmful and are not unpleasant, if they can be present in small granular or crystalline form and contain cavities of sufficient volume and of sufficiently uniform distribution to take up adequate proportions of lecithin.

It is obviously preferable to associate lecithin with a material or a carrier which is of itself useful, if not necessary, in baking, but the effect of carrying the lecithin into the mixture by including the lecithin in the cavities of granular material which in a dry form is mixed with the flour or other ingredients, is within the contemplation of this invention. Whatever the carrier may be, the lecithin will generally be combined with it in such proportions as to carry the highest possible concentration of lecithin with relation to the carrier.

It has been stated above that anhydrous dextrose will combine with or take up approximately 20% of its weight of lecithin. Normally, therefore, the proportions will be one part lecithin to five parts anhydrous dextrose. If desired, of course, the lecithin may be present in less than the maximum proportions. Thus the lecithin might be present in the proportions of one part lecithin to ten parts anhydrous dextrose. For various uses of the product therefore, the proportion of anhydrous dextrose to lecithin may be varied widely between the maximum which the dextrose or other carrier will take up and a minimum substantially below that maximum. The invention therefore contemplates varying the relative proportion of lecithin to anhydrous dextrose or other carrier within wide limits.

The dextrose or other material with which lecithin is compounded in the finished product of this invention and the finished product itself have been referred to as "crystalline," "granular" and "powdered." These words are not used and are to be understood as limiting the material to a particular form. The purposes of the invention are satisfied if the material which is combined with the lecithin is relatively finely divided and free-flowing. It is immaterial whether the particles are strictly crystalline or granular in form or of other form. The particles whatever the precise form in which they occur should be relatively small and may be of the general order of table salt or granulated sugar in size of particle. The particles contain an appreciable volume of cavities. In the finished product, the partcile of the combined lecithin and dextrose or other carrier are also relatively small so that the product pours freely and they may be granular or crystalline or of other form.

When it is stated that the product is "dry," the use of this word does not indicate that the product is totally free from moisture. Many products which are generally referred to as "dry" contain appreciable quantities of moisture. Thus commercial flour which appears to be dry and may be so considered in use actually contains an appreciable percentage of moisture, sometimes in the neighborhood of 14%.

The word "dry" is therefore used in the specification and claims where it occurs as meaning a product which is substantially dry in the sense that it appears to be dry and is free-flowing.

I claim:

1. A method of preparing a dry, finely-divided, free-flowing lecithin product, comprising the steps of agitating a quantity of anhydrous dextrose in small, finely subdivided granular form with cavities in the particles thereof, slowly discharging into the anhydrous dextrose under agitation a quantity of lecithin until the quantity of lecithin added is substantially equal to or less than 20% by weight of the resultant mass, and continuing the agitation until substantially all of the lecithin has been absorbed in the dextrose and has formed with it a relatively dry, free-flowing, finely subdivided, granular material.

2. A finely subdivided, granular composition of matter comprising a quantity of crystalline anhydrous dextrose, said dextrose being subdivided into relatively small particles, said particles having cavities therein and a quantity of lecithin mixed with said particles and absorbed into said cavities, the lecithin comprising 20% or less by weight of the combined mass, the combined mass being relatively dry, free-flowing, and nongreasy.

References Cited in the file of this patent

UNITED STATES PATENTS

| | | |
|---|---|---|
| 2,057,695 | Schwieger | Oct. 20, 1936 |
| 2,222,830 | Moss | Nov. 26, 1940 |
| 2,334,401 | Fitzpatrick et al. | Nov. 16, 1943 |
| 2,632,705 | Scharf | Mar. 24, 1953 |